UNITED STATES PATENT OFFICE.

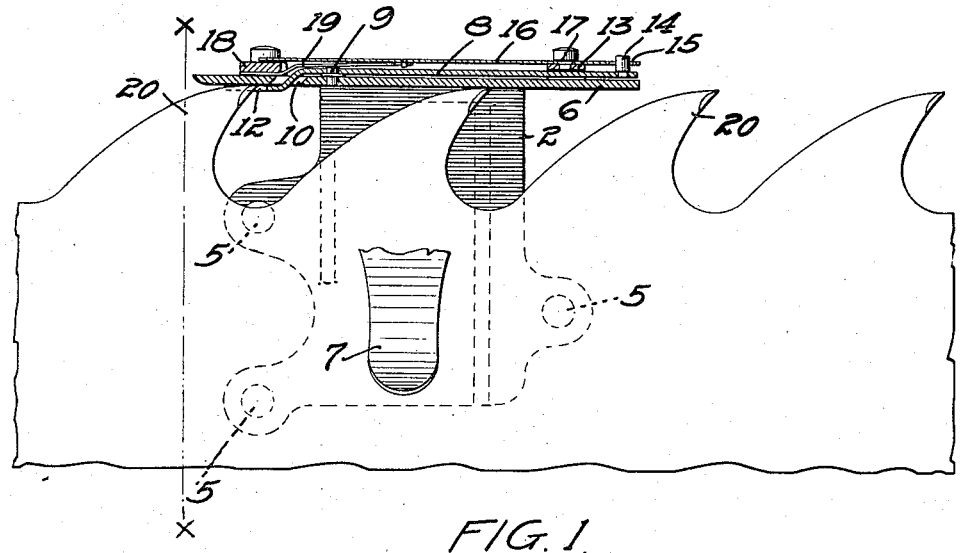
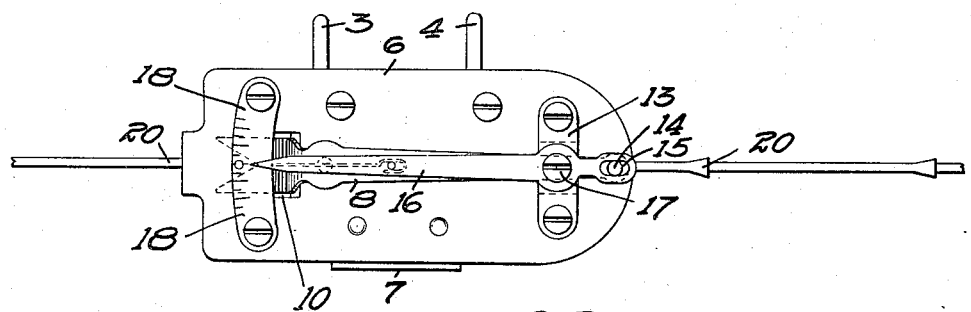
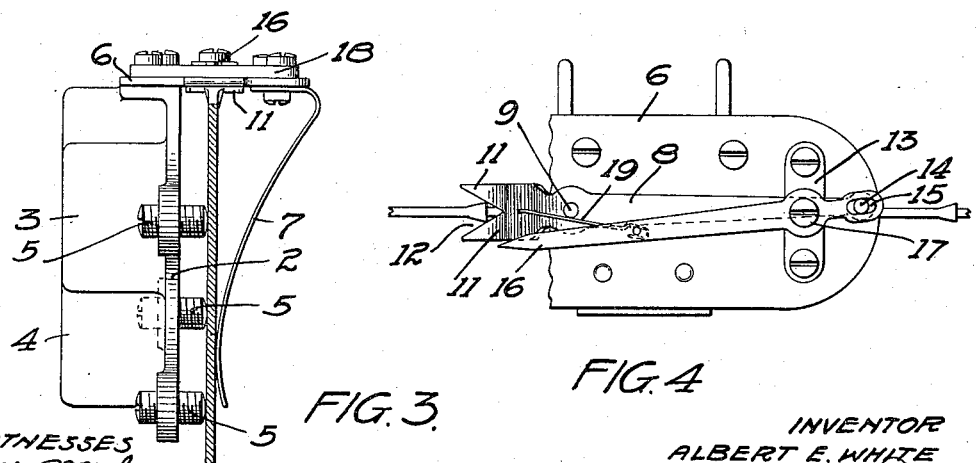

ALBERT E. WHITE, OF EAU CLAIRE, WISCONSIN.

SAW-TOOTH-CENTERING INDICATOR.

1,152,996. Specification of Letters Patent. Patented Sept. 7, 1915.

Application filed October 5, 1914. Serial No. 865,045.

*To all whom it may concern:*

Be it known that I, ALBERT E. WHITE, a citizen of the United States, resident of Eau Claire, county of Eau Claire, State of Wisconsin, have invented certain new and useful Improvements in Saw-Tooth-Centering Indicators, of which the following is a specification.

When a tooth of a saw used for sawing lumber becomes offset or bent out of alinement with the saw blade, it will groove the surface of the lumber, making it rough, uneven, and less salable, and requiring more power to operate the saw.

The object of my invention is to provide an extremely simple device by means of which any slight variation of a saw tooth from its proper alinement with the saw blade will be positively and accurately indicated when the device is moved over the saw.

A further object is to provide an indicator which can be easily and quickly applied to the saw.

Other objects of the invention will appear from the following detailed description.

My invention consists generally in various constructions and combinations, all as hereinafter described and particularly pointed out in the claims.

In the accompanying drawings forming part of this specification, Figure 1 is a side view of a portion of a saw blade, showing my invention, illustrated in longitudinal section, applied thereto, Fig. 2 is a top view of the same, Fig. 3 is a sectional view on the line $x$—$x$ of Fig. 1. Fig. 4 is a top view, with a portion of the frame of the indicator broken away to illustrate the forked lever with which the teeth of the saw are engaged.

In the drawing, 2 represents the frame, of suitable material, preferably aluminum, provided on one side with flanges 3 and 4 to be grasped by the fingers for moving the device back and forth on the saw blade. A series of centering screws 5 are preferably mounted in the frame 2 and adapted to bear on one side of the saw blade to center the device with respect to the teeth of the saw.

6 is a plate, secured by suitable means to the top of the frame and provided with a depending spring arm 7 that is adapted to bear on the opposite side of the saw blade from the flame 2, with sufficient pressure to hold the centering device in position on the blade, allowing it, however, to be removed entirely or pushed back and forth over the teeth of the saw. A lever 8 is pivoted at 9 near one end on the plate 6 and the short arm of said lever is downwardly turned through an opening 10 in the plate 6, adjacent to said pivot, and is provided with arms 11 having a V-shaped recess 12 between them. The long arm of the lever 8 extends over the plate 6 beneath a guide 13 and has a loose connection by means of a pin 14 and a slot 15 with the short arm of an indicator 16 that is pivoted at 17, preferably on the guide 13. The long arm of the indicator 16 extends over the lever 8 to a point beyond its pivot and is free to oscillate over a graduated plate 18 that is preferably arranged above the forked end of the lever 8 and adjacent thereto. A spring 19 normally tends to hold the indicator in the center of the graduated plate and in alinement with the forked lever. The apex of the V-shaped recess in the lever 8 is in alinement with the center of the graduations and with the indicator hand in its normal position. This recess is sufficiently wide to receive the point of the saw teeth as the device is moved over the blade and when a tooth contacts with the wall of the recess the lever will be rocked if the tooth happens to be out of center or alinement with the face of the saw blade, and the rocking of the lever will be transmitted to the indicator through the pivotal connections and the travel of the point of the indicator will be multiplied to such a degree that its movement will be plainly visible on the scale and the operator will know that the tooth on which the device is placed is out of alinement with the saw blade and needs attention. By multiplying the movement of the lever the operator's attention will instantly be called to a very slight deflection or bend in the saw tooth. The device may be moved rapidly over the saw from tooth to tooth and as soon as a bent tooth is discovered it can be straightened and the teeth easily and quickly alined.

In various ways the details of construction herein shown and described may be modified and still be within the scope of my invention.

I claim as my invention:

1. A saw tooth centering device comprising a suitable plate adapted for movement back and forth over the blade of a saw, a lever pivoted on said plate and having one end depending below said plate and adapted for engagement with the point of a saw tooth, and an indicator pivotally connected with the other end of said lever above said plate.

2. A saw tooth centering device comprising a support adapted to be placed on a saw, a lever pivoted in said support and having a recess provided with converging side walls adapted to receive the point of a saw tooth, and an indicator pivotally connected with said lever.

3. In a saw tooth centering device, a lever having a V-shaped recess therein adapted to receive the point of a saw tooth, the contact of the tooth with the edges of said recess alining the lever with the plane of the tooth, and means for indicating the degree of movement of the lever when the point of the tooth is out of the plane of the base thereof.

4. A device for indicating the lateral offset or deflection of a saw tooth, comprising a support adapted to be placed on a saw, a member pivoted on said support and having a V-shaped recess to receive the point of a tooth, the engagement of the edge of the recess with the tooth point oscillating said member if the tooth point is offset from the plane of the tooth, and means for indicating the movement of said member and the lateral deflection of the tooth point.

5. A saw tooth centering device comprising a support adapted to be placed on a saw, a lever pivoted in said support and having means adapted to receive the point of a saw tooth for alining the lever with the plane of the tooth, and an indicator pivotally connected with said lever.

In witness whereof, I have hereunto set my hand this 1st day of October, 1914.

ALBERT E. WHITE.

Witnesses:
PAULINE ANDERSEN,
H. A. WHITE.

Copies of this patent may be obtained for five cents each, by addressing the "Commissioner of Patents, Washington, D. C."